United States Patent [19]

Turpin

[11] 4,254,235
[45] Mar. 3, 1981

[54] THERMOSETTING POWDER PAINTS

[75] Inventor: Edward T. Turpin, Elyria, Ohio

[73] Assignee: SCM Corporation, New York, N.Y.

[21] Appl. No.: 49,220

[22] Filed: Jun. 18, 1979

[51] Int. Cl.³ .............................................. C08L 61/26
[52] U.S. Cl. .................................... 525/162; 427/195;
427/388.3; 525/443
[58] Field of Search ................... 427/195, 180, 374 R,
427/374 C, 375, 379, 384, 386, 388 R, 388 AB,
388 B, 27, 385 R; 528/269, 245, 256, 262;
428/524; 525/157, 162, 443, 515, 375, 437, 186

[56] References Cited

U.S. PATENT DOCUMENTS

| 3,883,462 | 5/1975 | Pearson | 528/262 X |
|---|---|---|---|
| 3,959,405 | 5/1976 | Labawa et al. | 427/195 X |
| 3,960,983 | 6/1976 | Blank | 427/388 B X |
| 3,980,733 | 9/1976 | Isaksen et al. | 427/195 X |
| 4,039,496 | 8/1977 | Hermann | 528/232 X |
| 4,064,191 | 12/1977 | Parekh | 525/186 |
| 4,118,437 | 10/1978 | Parekh | 525/162 |
| 4,138,528 | 2/1979 | Hahn et al. | 428/482 |

Primary Examiner—Michael R. Lusignan
Assistant Examiner—Thurman K. Page
Attorney, Agent, or Firm—Thomas M. Schmitz

[57] ABSTRACT

The invention pertains to thermosetting powder paints adapted to fuse and thermoset upon exposure to heat. The powder paint is based upon a two-component binder system comprising a polymeric glycoluril adapted to cross-link a matrix polymer having reactive hydroxyl, carboxyl, or amide groups.

10 Claims, 1 Drawing Figure

THERMOSETTING POWDER PAINTS

BACKGROUND OF THE INVENTION

This invention relates to improved thermosetting powder paints and more particularly pertains to polymeric glycoluril derivatives for cross-linking reactive polymers having reactive hydroxyl, carboxyl, or amide groups upon exposure to heat.

Powder paints are ordinarily manufactured from raw batch ingredients comprising resinous binders, opacifying and filler pigmentary solids, plasticizers, and other additives to provide opacity, good film properties, and adhesion to substrates. The raw batch ingredients are uniformly mixed, formed into coherent extrudate by hot extrusion, and then comminuted to form small particle powder paints which are ordinarily free flowing at normal room temperature. Powder paints usually are uniform small powders passing 325 mesh or less than about 44 microns. Powder paints contain little or no fugitive solvents and depend upon their own inherent characteristics of the powder to melt, level, coalesce, and fuse to form an attractive coherent film on the substrate. The powder must not fuse in the container and cannot be subjected to cold flow so as to maintain individual powder particles prior to use.

In recent years, thermosetting powder paints have become particularly suitable for use in commercial industrial process particularly since powder paints are essentially free of organic solvents whereby economic and social benefits are achieved by reduced air pollution, reduced energy use, and reduced health and fire hazards. Present commercial powder coatings often exhibit poor weathering properties although some expensive powder paints can obtain satisfactory weathering. Other difficulties often encountered in powder paints are caking or blocking of the powder in use and other mechanical application properties. Recently issued U.S. Pat. Nos. 4,118,437 and 4,064,191 disclose cross-linkable powder coatings wherein the cross-linking component is an alkylated glycoluril derivative.

It now has been found that an economical and substantially improved powder coating composition can be achieved by utilizing a polymeric cross-linker comprising an alkoxy methyl or methylol functional polymer produced by copolymerizing a glycoluril with a diol or another glycoluril. The polymeric glycoluril can comprise as low as 10% by weight of the thermosetting powder coating binder composition which exhibits excellent minimum tack greater than 70° C. and particularly important for non-fusing and non-blocking powder coatings. These and other advantages of this invention will become more apparent by referring to the Detailed Description of the Invention.

SUMMARY OF THE INVENTION

Briefly, the invention pertains to a powder coating composition comprising on a weight basis a mixture of 10% to 70% of a polymeric glycoluril cross-linker, and 30% to 90% of a reactive polymer whereby the polymeric glycoluril cross-links with reactive hydroxyl, carboxyl, and/or amide groups upon exposure to heat.

DETAILED DESCRIPTION OF THE INVENTION

Figure 1:
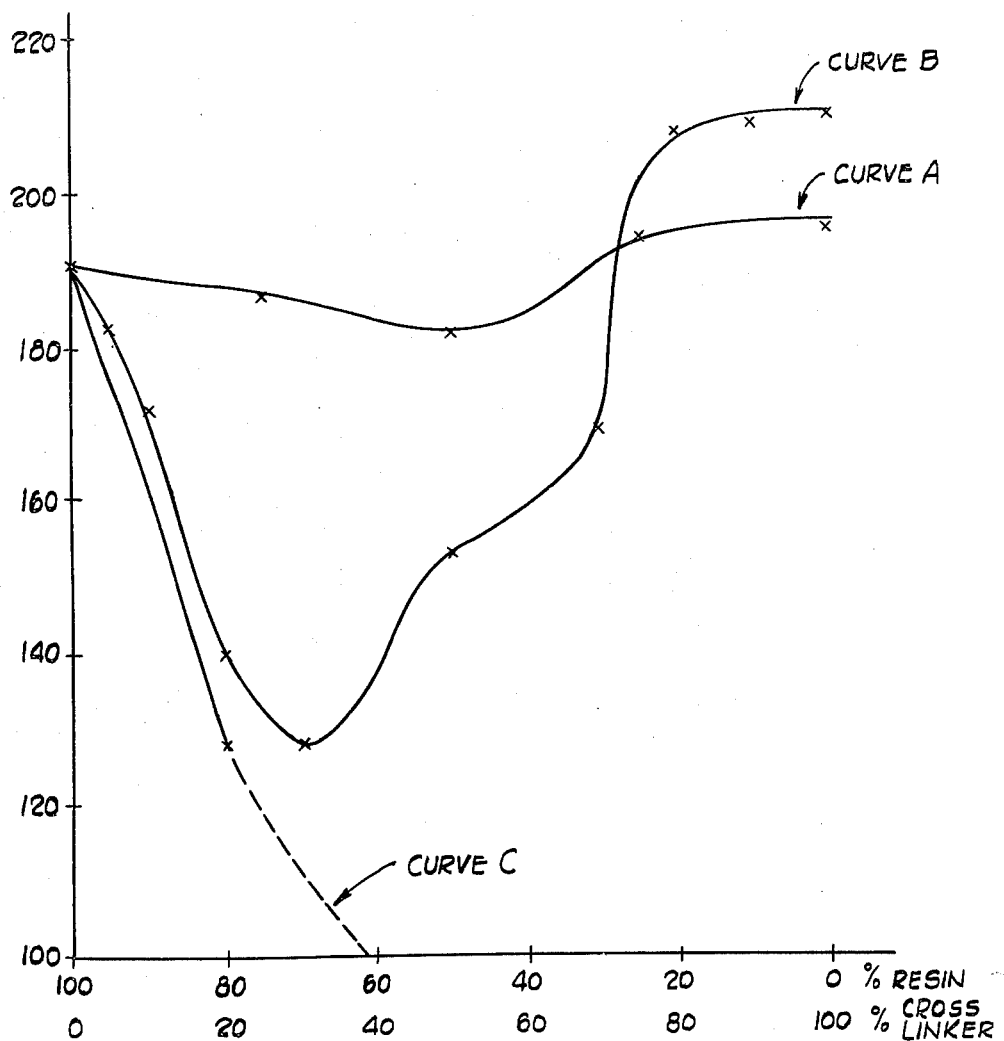
FIG. 1 illustrates the tack temperatures as a function of matrix polymer/cross-linking component and compares compositions of this invention with prior art compositions.

This invention pertains to thermosetting powder coatings primarily based upon a polymeric glycoluril cross-linking polymer adapted to cross-link a reactive matrix polymer upon application of heat.

Referring first to the Drawings, FIG. 1 illustrates the tack temperature as a function of matrix polymer/cross-linking component for compositions of this invention as well as prior art compositions. The x-axis in FIG. 1 indicates a weight ratio of matrix polymer/cross-linker wherein the cross-linking components are varied. Curve A illustrates the composition of this invention based on a polymeric glycoluril cross-linker. Curve B illustrates the same composition containing a monomeric glycoluril cross-linker in accordance as proposed in U.S. Pat. No. 4,118,437. Curve C similarly illustrates a melamine cross-linker consisting of hexamethoxymethyl melamine (cymel 300). The highly desirable Curve A provides approximately a consistent flat curve relative to Curves B and C which progressively depress tack temperatures and consequently increase undesirable caking or agglomeration of powder.

Referring next to the polymeric glycoluril cross-linker, the glycoluril polymer is alkoxy-methyl or alkoxy methylol polymer having a molecular weight between 500 and 5000 and preferably between 600 and 1500. The glycoluril polymer can b formed by self-condensation of tetra-alkoxy-methyl glycoluril and/or a tetra-methylol glycoluril, or a condensation copolymer of a diol or diacid or diamide or polymer diol or polymer diacid or diamide with a tetra-alkoxymethyl glycoluril and/or a tetra-methylol glycoluril wherein the resulting glycoluril polymer contains reactive methylol or alkoxy methyl groups. Diols are preferred and suitable diols for the copolymer can include simple monomer diols such as glycols, low molecular weight polyester diols, and polyurethane diols such as for example, hydrogenated bisphenol-A, cyclohexane dimethanol, and neopentyl terephthalate. The low molecular weight diols can be advantageously utilized to increase the molecular weight of the polymeric glycoluril or achieve highly desirable tack temperatures above about 70° C. which are necessary to prevent caking and blocking of the powder paint particles. Preferably, the finished powder paint has a tack temperature in the range of 75° C. to 95° C. Suitable monomeric diols ordinarily are free of alkyl ether groups, are liquid although can have melting points as high as 150° C., a hydroxyl content by weight of 10% to 55%, and molecular weights between about 60 and 350. Polyester diols can have a resin tack temperature of about 40° C. to 70° C., hydroxyl of 3% to 15% by weight, and molecular weights between about 200 and 1000. Glycoluril copolymers containing copolymerized diols can contain between 10% and 70% by weight diol copolymerized with alkoxy methyl or methylol glycoluril. Self-condensation glycoluril polymer can be produced by homopolymerizing units of tetra-alkoxy methyl glycoluril, or homopolymerizing tetra methylol glycoluril, or by copolymerizing a tetra-alkoxy methyl glycoluril and a tetra-methylol glycoluril. In either the diol copolymer or the self-condensation polymers, and alkoxy methyl groups and/or the methylol groups comprise between about 5% and 40% by weight of the polymeric glycoluril cross-linking component.

Glycolurils are disclosed in U.S. Pat. No. 4,064,191 and are also known as acetylenediureas. Glycolurils are derived by reacting two moles of urea with one mole of glyoxal to provide a complex ring structure illustrated as follows:

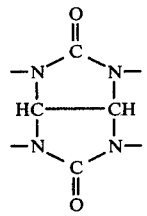

The foregoing glycoluril is referred to as "G" in the following polymeric structures illustrating the polymeric glycoluril in accordance with this invention. The preparation of various glycolurils are illustrated in U.S. Pat. No. 4,064,191 such as tetramethylol glycoluril, tetrabutoxymethyl glycoluril, partially methylolated glycoluril, tetramethoxymethyl glycoluril, and dimethoxydiethoxy glycoluril. Useful glycoluril derivatives include for example, mono- and dimethylether of dimethylol glycoluril, the trimethylether of tetramethylol glycoluril, the tetramethylether of tetramethylol glycoluril, tetrakisethoxymethyl glycoluril, tetrakisopropoxymethyl glycoluril, tetrakisbutoxymethyl glycoluril, tetrakisamyloxymethyl glycoluril, tetrakishexoxymethyl glycoluril and the like. A self-condensate glycoluril polymer can be illustrated as follows:

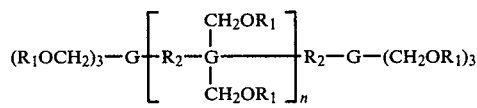

wherein:
G = said glycoluril structure
$R_1$ = H or alkyl group having 1 to 4 carbon atoms
$R_2$ = —$CH_2$ or (—$CH_2$—O—$CH_2$—)
n = 1 to 5 units Similarly, a diol condensate copolymer is illustrated as follows:

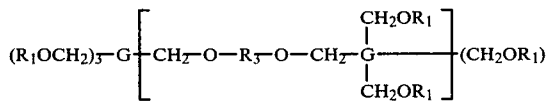

wherein:
G = said glycoluril structure
$R_1$ = H or alkyl group having 1 to 4 carbon atoms
$R_3$ = diol with hydroxyl groups removed
n = 1 to 4 units Thus, the polymeric glycoluril contains at least two polymerized glycoluril monomer units to provide a polymer chain containing at least two glycoluril structures (G). The molecular weight of useful polymeric glycoluril condensate polymers is between 500 and 5000 and preferably between 600 and 1500. The polymeric glycoluril provides an excellent cross-linking component for reactive matrix polymers in powder coating compositions.

Preparation of the polymeric glycoluril can be facilitated by the inclusion of between 0.5% and 5% by weight acid catalyst. Amine or ammonia can be added to buffer the acid catalyst and moderate the reaction rate whereby the acid catalyst is neutralized up to about 300%. The rate of reaction can be varied depending on the acid and amine strength, the degree of neutralization, and the level of acid catalyst used. Acid can be added first to promote the reaction and then amine can be added to control and prevent further reaction while the polymer is being discharged.

Referring next to the reactive polymer adapted to be cross-linked by the polymeric glycoluril cross-linker, the reactive polymer can be a polymer having reactive hydroxyls, or carboxyls, or amide groups. The polymer can have a molecular weight between about 100 and 100,000 and contains by weight between 1% and 50% reactive carboxyl, hydroxyl or amide groups, or combinations thereof. These reactive groups are adated to react with the methylol and/or alkoxy-methyl groups on the polymeric glycoluril. Generally, the polymers can be epoxy polymers, polyester polymer, acrylic polymers, phenolic polymers, vinyl polymers, and similar polymers, provided such polymers have a tack temperature above 75° C. to provide adequate storage stability and prevent caking. A tack temperature is the lowest temperature above which dry solid polymer particles tend to cake or block within a 60 second time period. The reactive polymers are preferably polymers with a melt temperature or Tg above about 75° C., generally between 80° C. and 200° C., and preferably between 100° C. and 140° C. All polymers can have reactive hydroxyl, carboxyl or amide groups attached to the polymer such as by esterification in polyester polymer or by addition polymerization of carboxyl or hydroxyl monomers in acrylic or vinyl polymers. Particularly preferred reactive polymers contain reactive hydroxyl groups. Hydroxyl or carboxyl terminated polyester polymers can be produced by an esterification reaction of glycols together with saturated, unsaturated, aliphatic, or aromatic dicarboxylic acids such as phthalic, isophthalic, terephthalic, maleic, fumaric, succinic, adipic, azelaic, malonic and similar dicarboxylic acids. The preferred glycols are aliphatic glycols such as 1,3-butylene glycol or 1,4-butylene glycol; ethylene glycol and propylene glycol; neopentyl glycol as well as minor amounts of polyols such as trimethylol propane or ethane, or petaerythritol. The glycols are reacted with the dicarboxylic acids at temperatures preferably above about 200° C. to substantially coreact all the available carboxylic acid to provide a hydroxyl polyester. Conversely, excess dicarboxylic acid is reacted completely with lesser equivalents of polyol to provide a carboxyl terminated polyester polymer. The excess glycol or carboxylic component can be about 20% to 100% molar equivalent excess of the other component to provide a hydroxyl or carboxyl terminated polyester adapted to be cross-linked by the polymeric glycoluril component. Vinyl and acrylic polymers produced from copolymerization of ethylenic monomers can contain reactive hydroxyl, carboxyl, or amide groups by copolymerizing minor amounts of functional ethylenic monomers such as acrylic or methacrylic acid for carboxyl groups, hydroxyethyl, or hydroxy-propyl acrylate or similar hydroxyl alkyl acrylates or methacrylates to provide for hydroxyl groups, and acrylamide or similar alkylamides for amide groups. Epoxy and phenolic polymers can have reactive functional groups esterified or grafted onto the polymer chain to provide a reactive polymer. Reactive polymers in accordance with this invention contain between 1% and 50% by weight functional hydroxyl, carboxyl, and/or amide groups, and preferably 1% to 12% of said reactive functional groups.

The polymeric glycoluril cross-linker and the reactive polymer can be combined to provide a homogeneous mixture on a weight basis of preferably 10% to 70% of polymeric glycoluril mixed with 30% to 90% reactive polymer. The most preferred and optimized combination comprises 10% to 30% polymeric glycoluril and 70% to 90% reactive polymer. The combination exhibits a tack temperature of at least 70° C.

The polymeric glycoluril and the reactive polymer can be thoroughly and uniformly mixed by mildly heating the solid materials with pigmentary solids, plasticizers and other components to uniformly blend the polymeric components with the pigmentary solids. Pigments can ordinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chromium oxide green, phthalocyanine green, phthalonitrile blue, ultra-marine blue, cadmium pigments, chromium pigments, and the like. Filler pigments such as clay, silica, talc, mica, wollastonite, wood flower and the like can be added. The raw batch ingredients can be thoroughly premixed in a high intensity mixer such as a high speed dry blender whereby the materials are discharged in a uniform mixture. The high intensity mixer discharges the batch components to a heated screw extruder wherein the extruder is internally heated by an indirect heating fluid such as steam, hot water, or synthetic oil whereupon the exit extruder temperature is regulated according to the type of powder paint being produced but generally is between about 90° C. and 150° C. at the heated exit die of the screw fed extruder. The extrudate emerges from the extruder as a rope which is chilled and squeezed to a thin ribbon by cooling rolls then passes onto a water-cooled stainless steel conveyor belt whereby the plastic ribbon extrudate fully hardens. The cooled extrudate then passes through a mechanical comminuter disposed at the end of the cooled stainless steel belt to efficiently break the fragile brittle ribbon into very small flakes. The small flakes are then discharged into a cooled mill, such as a hammer mill, to grind the small flakes into powder paint of less than 325 mesh and preferably passing a 200 mesh U.S. Standard Sieve Screen whereupon the powder can be further classified into particle size if desired. The resulting powder coatings advantageously exhibit a tack temperature well above 70° C. whereby the dry powder does not cake or block, can be easily spray applied, and fused with moderate heat to provide a thermoset continuous surface coating.

The powder paints in accordance with this invention can be applied to a steel panel substrate and moderately heated between temperatures of about 140° C. and 205° C. for 5 to 30 minutes to obtain desirable flow out and cure. The advantages of this invention are further illustrated in the following examples.

EXAMPLE 1

Glycoluril Prepolymer Condensate A

Into a reaction vessel equipped with stirrer, thermometer, nitrogen inlet tube, distillation head and condenser, was charged 2000 grams of tetramethoxymethyl glycoluril which was melted and heated to 110° C. 32 grams sulfamic acid (Polycat 200) catalyst was added over a 30-minute period at 110° C. to 120° C. to control foaming. The contents were then upheated to a temperature of 170° C. over a period of 2 hours. The batch was held at 170° C. until a tack temperature of 80° to 85° C. was reached and then 32 grams of amine (Quadrol, i.e. 1 mole ethylene diamine reacted with 4 moles propylene oxide) were added and stirred in. The batch was then discharged into a tray and cooled to room temperature. This self-condensed prepolymer of TMMGU had a tack temperature of 84° C., a viscosity at 50% non-volatile in meta-pyrol of D on the Gardner-Holdt Scale, and a methoxy equivalent weight (MEW) of 143.

The distillate (296 grams) consisted of 161 grams dimethylformal, 108 grams methanol, and 27 grams formaldehyde by gas chromatographic analysis. The presence of methanol and formaldehyde in the distillate indicates the presence of some methylol ($-CH_2OH$) groups in the original TMMGU. The methoxy equivalent weight (MEW) was determined by reaction of a sample with a large excess of ethylene glycol monobutyl ether using 3.0%, based on the TMMGU, of Polycat 200 catalyst. The distillate was analyzed for methanol content by gas chromatographic analysis. MEW is given by the formula:

$$MEW = (32.0 \times S)/M$$

where,
S = sample size
M = Methanol content of distillate in grams

Glycoluril Prepolymer Condensate B

Into a reaction vessel equipped as in Example A was charged 1064 grams tetramethoxymethyl glycoluril (TMMGU) and 532 grams hydrogenated bisphenol-A which was melted and heated to 120° C. 14 grams of Polycat 200 catayst was added slowly over a 30-minute period at 110°-120° C. to control foaming. The batch temperature was then raised slowly to 160° C. and foaming controlled with 2 grams additions of Quadrol. Total Quadrol added is 10.4 grams. Upon reaching a tack temperature of 80°-85° C., the batch was discharged into a tray. The product, a methoxy-methylfunctional copolymer of TMMGU and HBPA, has a tack temperature of 84° C., a viscosity at 50% non-volatile content in meta-pyrol of K and a methoxy equivalent weight of 212. A small amount of self-condensation had also occurred in this reaction in addition to the primary methoxyhydroxyl reaction.

Glycoluril Prepolymer Condensate C

Into a reaction vessel equipped as in Example A but also fitted with a fractionating columing was charged 1006 grams neopentyl glycol, 1266 grams terephthalic acid plus 0.8 grams butyl stannoic acid as the esterification catalyst. This polyester diol was processed by usual condensation polymerization techniques to an acid number of 4.0 mg. KOH per gram. It had a tack temperature of 54° C., a hydroxyl content of 3.3% and a calculated molecular weight of 909. The batch was cooled to 150° C. and then 1020 grams of TMMGU were added and melted in. 30 grams Quadrol and 30 grams Polycat 200 were then added at 120° C. The temperature was raised slowly to 160° C. distilling off methanol all the time. The batch was held at 160° C. for a tack temperature of 75° C. to 85° C. and then discharged into a tray. The final product had a tack temperature of 75° C., a viscosity at 50% non-volatile in metapyrol of U-V, and a methoxy equivalent weight of 383.

EXAMPLE 2

Examples of hydroxyl-functional resins which can be used in combination with the alkoxy-methyl or methylol functional cross-linking prepolymer condensates of the present invention are as follows:

Polyester Resin 1

VPE 5802 is a hydroxyl-functional polyester resin supplied by Goodyear. The polyester had an acid no. of 12-13 mg. KOH per gram, a hydroxyl content of 1.75%, a tack temprature of 84° C., and a viscosity at 50% non-volatile in meta-pyrol of X-Y.

Styrene-Allyl Alcohol Copolymer 2

RJ100 is a copolymer of styrene and allyl alcohol supplied by Monsanto. It has a tack temperature of 88° C., a hydroxyl content of 5.7%, a molecular weight of 1500, and a viscosity at 50% non-volatile in meta-pyrol of P. The percent by weight composition calculated from the hydroxyl content is 80.7% styrene and 19.3% allyl alcohol.

Acrylic Resin 3

This is a resin prepared by the bulk (solvent-free) polymerization process from 64 grams styrene, 10 grams butyl acrylate, 24 grams hydroxy propyl methacrylate, 2 grams tertiary butyl penbenzoate, 2 grams methacrylic acid and 1 gram mercaptoethanol. It has a calculated hydroxyl content of 2.7%, an acid no. of 13, a tack temperature of 89° C., and a viscosity of X at 50% NV in meta-pyrol

EXAMPLES 3-12

In order that the concept of the present invention be more completely understood, the following examples are set forth in which all parts are parts by weight unless otherwise stated. In particular, Examples 3–12 of Table I illustrate a series of powder paints in which the prepolymer condensates of the present invention are compared to similar paints made from unmodified TMMGU as described by U.S. Pat. No. 4,118,437. All powder paints were compounded by standard methods well-known to powder aint chemists. The pigment (titanium dioxide) in binder ratio was 0.5 in all cases and all paints were applied by standard electrostatic spray equipment to 24 guage 4"×12" phosphate-treated steel panels, and baked in an air-circulated oven at 177° C. for a period of 20 minutes. Cured film thicknesses ranged between 1.0 and 1.5 mils.

TABLE I

TMMGU and TMMGU PREPOLYMER CONDENSATE-BASED POWDER PAINT PROPERTIES

| Example No. | 3 | 4 | 5 | 6 | 7 | 8 | 9 | 10 | 11 | 12 |
|---|---|---|---|---|---|---|---|---|---|---|
| Cross-Linker PBW | TMMGU | TMMGU | TMMGU | TMMGU | TMMGU | TMMGU | Ex. A | Ex. B | Ex. C | Ex. A |
| Cross-Linker | 3.28 | 3.93 | 4.59 | 5.24 | 5.90 | 6.55 | 6.55 | 6.55 | 13.1 | 8.52 |
| VPE5802 (Ex. 1) | 62.3 | 61.6 | 60.9 | 60.3 | 59.6 | 59.0 | 59.0 | 59.0 | 52.4 | 57.0 |
| TiO$_2$ | 32.8 | 32.8 | 32.8 | 32.8 | 32.8 | 32.8 | 32.8 | 32.8 | 32.8 | 32.8 |
| Polycat 200 | 0.20 | 0.20 | 0.20 | 0.20 | 0.20 | 0.20 | 0.20 | 0.20 | 0.20 | 0.20 |
| Quadrol | 0.20 | 0.20 | 0.20 | 0.20 | 0.20 | 0.20 | 0.20 | 0.20 | 0.20 | 0.20 |
| Flow Agent | 0.65 | 0.65 | 0.65 | 0.65 | 0.65 | 0.65 | 0.65 | 0.65 | 0.65 | 0.65 |
| Degassing Agent (Benzoin) | 0.65 | 0.65 | 0.65 | 0.65 | 0.65 | 0.65 | 0.65 | 0.65 | 0.65 | 0.65 |
| % of Theoretical Cross-Linker | 60 | 73 | 86 | 99 | 112 | 126 | 75 | 51 | 63 | 100 |
| Phys. Stab. at 45° C. for 7 days | Good | Good | Fair | Fair | V. Poor | V. Poor | Excel. | Excel. | Excel. | Excel. |
| Tack Temp. °C. | 75 | 78 | 74 | 68 | 67 | 66 | 76 | 80 | 76 | 77 |
| Gel Time Secs. (204° C.) | 60 | 50 | 40 | 45 | 55 | 55 | 30 | 80 | 35 | 70 |
| GLOSS - 60° | 90 | 93 | 93 | 95 | 93 | 87 | 95 | 95 | 95 | 90 |
| - 20° | 32 | 42 | 71 | 73 | 77 | 51 | 74 | 66 | 70 | 61 |
| Δ E (177/204° C.)[1] | 0.77 | 0.52 | 0.98 | 0.76 | 1.49 | 3.58 | 1.12 | 1.08 | 0.87 | 1.0 |
| MEK DOUBLE RUBS[2] | 150-200 | 350-400 | 300-350 | 450-500 | 350-400 | 350-400 | 300 | 300 | 250 | 300 |
| Impact (DIR/REV) In-Lbs. | 30/20 | 160/160 | 160/140 | 160/160 | 160/160 | 160/160 | 160/160 | 160/120 | 160/160 | 160 |
| Pencil Hardness (Faber) | H | H | H | H | H | H | 2H | H | H | 2H |

[1] Yellowing Index between 177° C. and 204° C.
[2] No. of double rubs to expose the steel substrate.

It can be seen from the Table I results that excellent physical stability cannot be achieved using straight TMMGU as the cross-linking agent (Examples 3 to 8). Even at the lowest ratios of TMMGU to resin of 5/95 to 7/93 (Examples 3 to 5) the physical stability is not as good as with the prepolymer condensates of the present invention (Examples 9-12). At the 5/95 ratio of TMMGU to resin, cure and physical properties of the coating are already deficient so that it is not practical to reduce the level of TMMGU any farther to improve physical stability. Although the melting point of TMMGU (117° C.) is actually higher than the tack temperatures of the prepolymer condensates of the present invention (75°-85° C.), TMMGU is monomeric and miscible with the resin and thus, has a strong Tg—depressant effect in the finished powder blend. The data in FIG. 1 provides further strong experimental evidence for undesirable Tg—depressant effect of monomeric methoxy-methyl type cross-linking agents in blend with a typical polyester (VPE5802) powder resin, compared to a typical prepolymer condensate of the present invention (prepolymer A). The prepolymers of the present invention are a much greater improvement, exhibit a minimum "eutectic" effect of mixed solids, and provides a substantial improvement in anti-caking effect when compared to TMMGU and hexamethoxymethyl melamine (HMMM).

Thus, it is apparent that the conflict between physical stability (caking) and coating performance with the use of TMMGU as a powder cross-linker has been resolved by the use of the prepolymer condensates of the present invention replacing the simple TMMGU. Increased levels of the prepolymer condensates up to stoichiometric proportions in Examples 9–11 provide even better properties and still have good package stability.

EXAMPLES 13 & 14

Table II gives further examples of powder formulae using a resin of Example 1 and a resin of Example 2.

TABLE II

PROPERTIES OF POWDER COATINGS BASED ON RJ100 (Copolymer 2)

| Example No. | 13 | 14 |
| --- | --- | --- |
| Cross-Linker | Ex. A | Ex. A |
| Resin | RJ100 | RJ100 |
| PBW-Cross-linker | 20.9 | 13.1 |
| PBW Resin | 44.4 | 52.4 |
| TiO$_2$ | 32.7 | 32.7 |
| Polycat 200 | 0.36 | 0.23 |
| Quadrol | 0.36 | 0.23 |
| Flow Agent | 0.65 | 0.65 |
| Benzoin | 0.65 | 0.65 |
| % of Theoretical Cross-Linker | 100 | 53 |
| Phys. Stab. (45° C.) | Good | Excel. |
| Tack Temp. °C. | 77 | 76 |
| Gel Time (204° C.) | 150 | 80 |
| GLOSS - 60° | 101 | 102 |
| - 20° | 98 | 96 |
| Δ E (177/204° C.) | 1.40 | 2.20 |
| MEK Rubs | 350–400 | 350–400 |
| Impact (DIR/REV) | <5/<5 | <5/<5 |
| Pencil Hardness (Faber) | 2H | 2H |

We claim:

1. A thermosetting powder coating composition adapted to be applied to a substrate as a powder and heat fused to provide a cross-linked thermoset continuous surface coating, comprising on a weight basis:
   between 30% and 90% of a reactive matrix polymer having reactive groups selected from hydroxyl, carboxyl, and amide groups;
   between 10% and 70% of a polymeric glycoluril having reactive methylol and/or alkoxy methyl groups for cross-linking with said reactive groups on said matrix polymer upon exposure to heat, said polymeric glycoluril having a molecular weight between about 500 and 5000 and being a condensation polymer of tetra-alkoxy-methyl glycoluril and/or tetra-methylol glycoluril containing at least 3 polymeric units selected from a self-condensate glycouril polymer containing at least 3 glycoluril units or a diol condensate polymer containing at least 2 glycoluril units condensed with diol; and
   said powder coating having a tack temperature greater tha 70° C.

2. The powder paint composition of claim 1 wherein the polymeric glycoluril is a copolymer containing by weight between about 10% and 70% copolymerized diol.

3. The powder paint composition of claim 1 wherein the polymeric glycoluril is a homopolymer of tetra-alkoxy-methyl glycoluril.

4. The powder paint composition of claim 1 wherein the polymeric glycoluril is a homopolymer of tetra-methylol glycoluril.

5. The powder paint composition of claim 1 wherein the polymeric glycoluril is a copolymer of tetra-alkoxy-methyl glycoluril and tetra-methylol glycoluril.

6. The powder paint composition of claim 1 wherein the composition comprises by weight between 70% and 90% reactive matrix polymer and between 10% and 30% polymeric glycoluril.

7. In a process of producing a thermosetting powder paint composition containing a reactive matrix polymer having reactive groups of hydroxy, carboxy, or amide adapted to be cross-linked upon heat fusing the powder paint, the improvement consisting of the step:
   providing in said powder paint composition a cross-linking polymer for cross-linking with the reactive groups of said matrix polymer, said cross-linking polymer produced by condensation polymerization of a glycoluril selected from tetra-alkoxy-methyl glycoluril or a tetra-methylol glycoluril to produce a polymeric glycoluril having a molecular weight between about 500 and 5000 and containing by weight between 4% and 40% alkoxy-methyl and/or methylol groups for cross-linking with the reactive groups on said matrix polymer, said polymeric glycol containing at least 3 polymeric units selected from a self-condensate glycoluril polymer containing at least 3 glycoluril units or a diol condensate polymer containing at least 2 glycoluril units condensed with diol.

8. The process in claim 7 wherein the polymeric glycoluril is a homopolymer of tetra-alkoxy-methyl glycoluril.

9. The process in claim 7 wherein the polymeric glycoluril is a homopolymer of tetra-methyl glycoluril.

10. The process of claim 7 wherein the polymeric glycoluril is a copolymer of tetra-alkoxy-methyl glycoluril and tetra-methylol glycoluril.

* * * * *